United States Patent [19]

Arai

[11] Patent Number: 5,184,858
[45] Date of Patent: Feb. 9, 1993

[54] SUCKER FOR PLATE GLASS

[75] Inventor: Toshimitsu Arai, Sakai, Japan

[73] Assignee: Toyo Sangyo Co., Ltd., Osaka, Japan

[21] Appl. No.: 761,245

[22] Filed: Sep. 17, 1991

[51] Int. Cl.⁵ .................... B25J 15/06; B66C 1/02; G01L 19/12

[52] U.S. Cl. .................... 294/64.1; 116/70; 294/907

[58] Field of Search .................... 294/64.1–64.3, 294/65, 907; 29/743; 116/67 R, 68, 70; 414/627, 737, 752; 901/40

[56] References Cited

U.S. PATENT DOCUMENTS

| | | | |
|---|---|---|---|
| 1,757,529 | 5/1930 | Jones | 294/64.1 |
| 2,895,504 | 7/1959 | Lederer | 116/70 X |
| 3,240,525 | 3/1966 | Wood | 294/64.1 |
| 4,466,764 | 8/1984 | Hutter | 294/64.1 X |
| 4,683,654 | 8/1987 | Scholten et al. | 294/64.1 X |

FOREIGN PATENT DOCUMENTS

| | | | |
|---|---|---|---|
| 275337 | 7/1970 | U.S.S.R. | 294/65 |
| 954315 | 4/1964 | United Kingdom | 294/64.1 |

*Primary Examiner*—Johnny D. Cherry
*Attorney, Agent, or Firm*—Wenderoth, Lind & Ponack

[57] ABSTRACT

A sucker for suctioning and lifting a sheet of plate glass has a sucker body defining a suction hole at a suction surface of the body. The sucker body carries a manual vacuum pump formed with a suction hole, a sensor for detecting the degree of vacuum and a sound generator. The sensor is provided in a suction channel connecting the suction hole at the suction surface of the sucker body with the suction hole in the vacuum pump. The sound generator is turned on when the sensor detects a predetermined degree of vacuum.

2 Claims, 4 Drawing Sheets

1

SUCKER FOR PLATE GLASS

BACKGROUND OF THE INVENTION

This invention relates to a hand-held sucker for use in lifting plate glass.

A conventional sucker for use in sucking and lifting plate glass comprises a sucker body, and a manual vacuum pump adapted to be mounted on the sucker body by rocking a handle. The degree of vacuum on the suction surface is measured with a pressure gauge.

With this prior sucker, one has to check the pressure gauge in order to check the degree of vacuum, i.e. the suction force. Thus, one might lift a sheet of plate glass sucked to the sucker, without knowing that the suction force has reduced due to air leakage, and thus then drop and break it.

SUMMARY OF THE INVENTION

An object of this invention is to provide, in view of these problems, a sucker in which the maximum suction force can be checked and any reduction in suction force due to air leakage can be detected by use of sound, thereby solving the problems resulting from reduction in the suction force.

According to the present invention, in order to solve the above problems, there is provided a sucker comprising a sucker body formed with a suction hole in a suction surface thereof and a manual vacuum pump formed with a suction hole, a sensor for detecting the degree of vacuum, and a sound generator which are mounted on said sucker body, said sensor for detecting the degree of vacuum being provided in a suction channel connecting said suction port with said suction hole, said sound generator being adapted to be turned on when said sensor for detecting the degree of vacuum detects a predetermined degree of vacuum.

By operating the manual vacuum pump with the sucker body placed on a piece of plate glass, a vacuum is created on the suction surface of the sucker body, so that the suction body is stuck to the plate glass.

When the degree of vacuum reaches a predetermined value, the sound generator is actuated temporarily by the sensor for detecting the degree of vacuum to confirm this fact by sound.

If the degree of vacuum should fall from the predetermined value, the sensor for detecting the degree of vacuum causes the sound generator to produce sound continuously. Thus the operator can prevent the glass from being dropped by controlling the vacuum pump.

According to this invention, the sucker body carries a manual vacuum pump, a sensor for detecting the degree of vacuum and a sound generator. When the degree of vacuum on the suction surface of the sucker body reaches a predetermined value, the sound generator is turned off by the sensor. Thus, the completion of suction by the sucker body and the occurrence of vacuum leakage can be detected in the form of sound. This greatly improves the safety in using the sucker.

BRIEF DESCRIPTION OF THE DRAWINGS

Other features and objects of the present invention will become apparent from the following description taken with reference to the accompanying drawings, in which.

DETAILED DESCRIPTION OF THE PREFERRED EMBODIMENT

Figure 1:
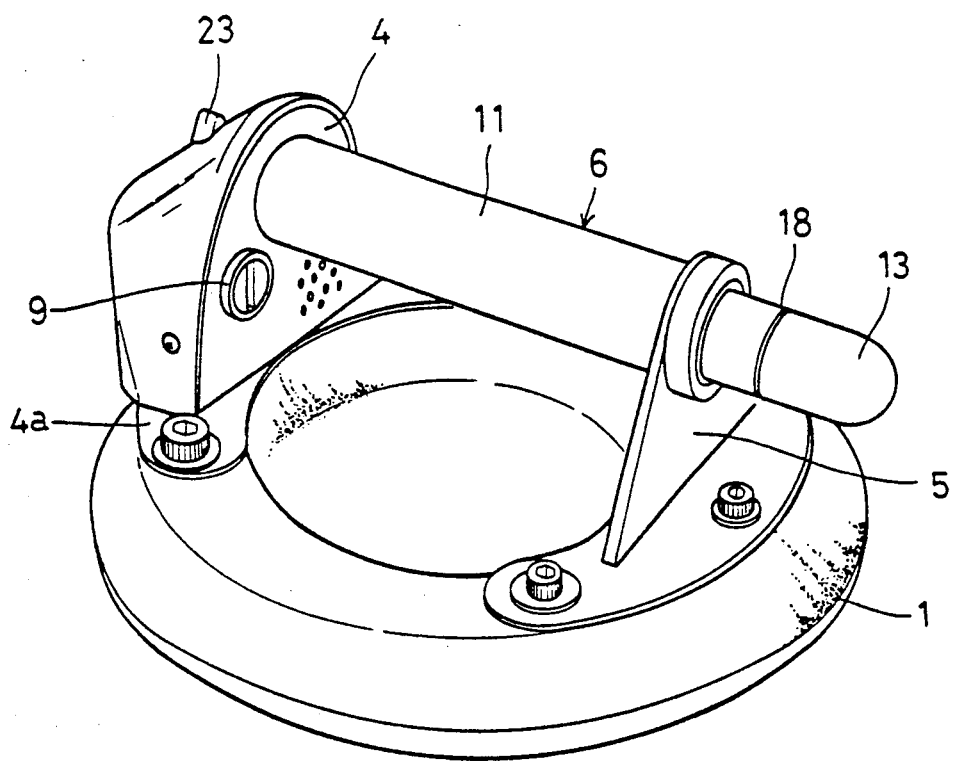
FIG. 1 is a perspective view of the sucker according to this invention.
Figure 3:
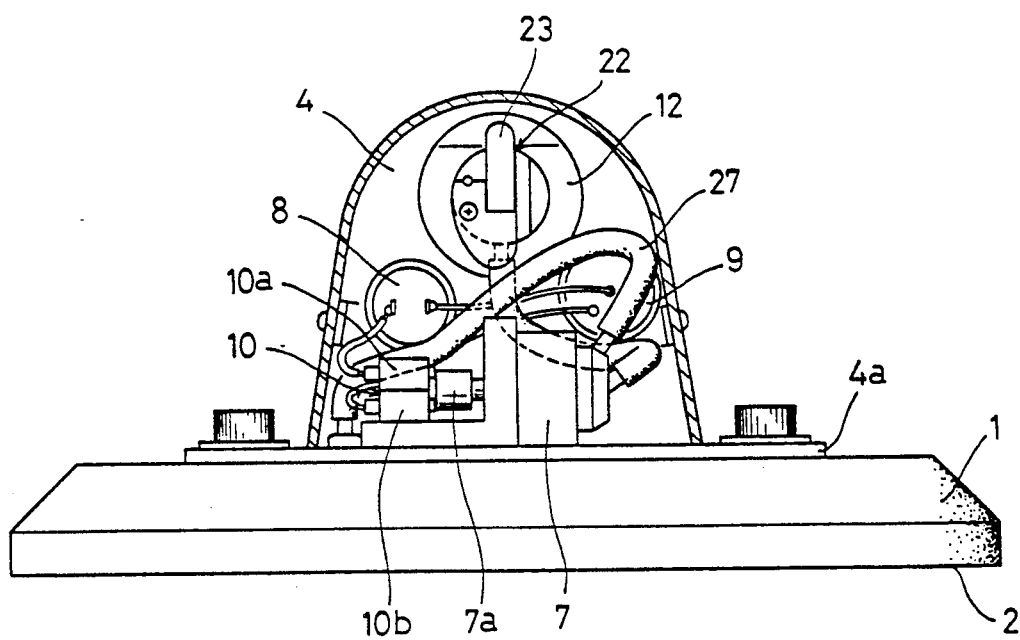
FIG. 3 is a front view of the same, partially broken away.
Figure 2:
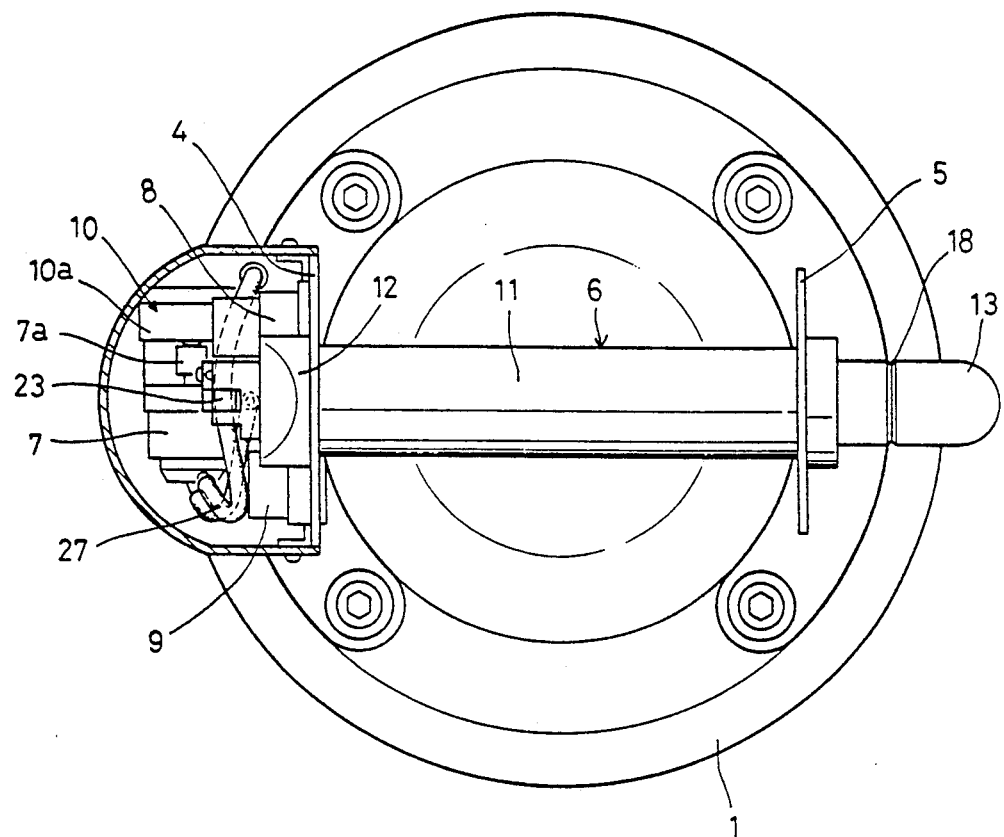
FIG. 2 is a plan view of the same.
Figure 5:
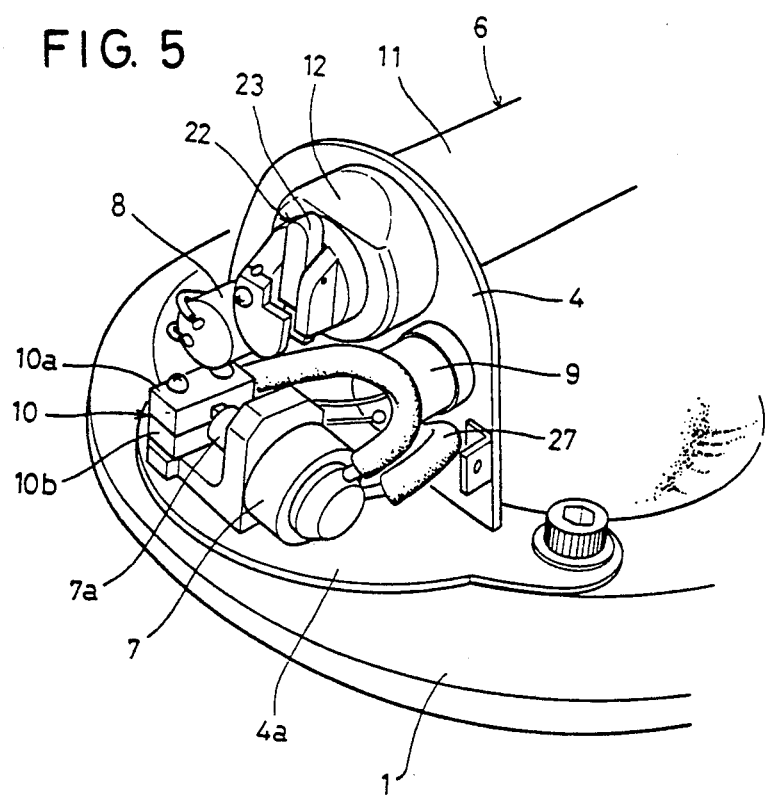
FIG. 5 is perspective view of a portion of the same.

Now the embodiment of this invention will be described with reference to the accompanying drawings.

As shown, a disk-shaped sucker body 1 is made mainly of rubber and has its suction surface 2 recessed for facilitating suctioning as shown at 3.

On the top surface of the sucker body 1, there are provided a pair of support plates 4 and 5 opposite to and at a distance from each other. A manual vacuum pump 6, which also serves as a grip, extends between the support plates 4 and 5. One of the support plates 4 carries a sensor 7 for detecting the degree of vacuum, a sound generator 8, a power source 9 for the sound generator 8 and a switch 10 adapted to turn on and off the sensor 7.

The manual vacuum pump 6 comprises a cylinder 11 extending between the support plates 4 and 5, a head 12 secured to one end of the cylinder 11, a control member 13 inserted into the cylinder 11 from the other end, a piston 14 having a rod 15 coupled to the control member 13, and a spring 17 bearing on a partitioning wall 16 in a compressed state. The piston 14 is normally biased by the spring 17 toward the retracted position.

The piston 14 is adapted to allow compressed air to escape rearward when it is moving forward while being pushed by the control member 13 and to create a vacuum when moving rearward biased by the spring 17. An indicator line 18 is provided on the outer periphery of the control member 13 which shows the degree of vacuum.

Figure 4:
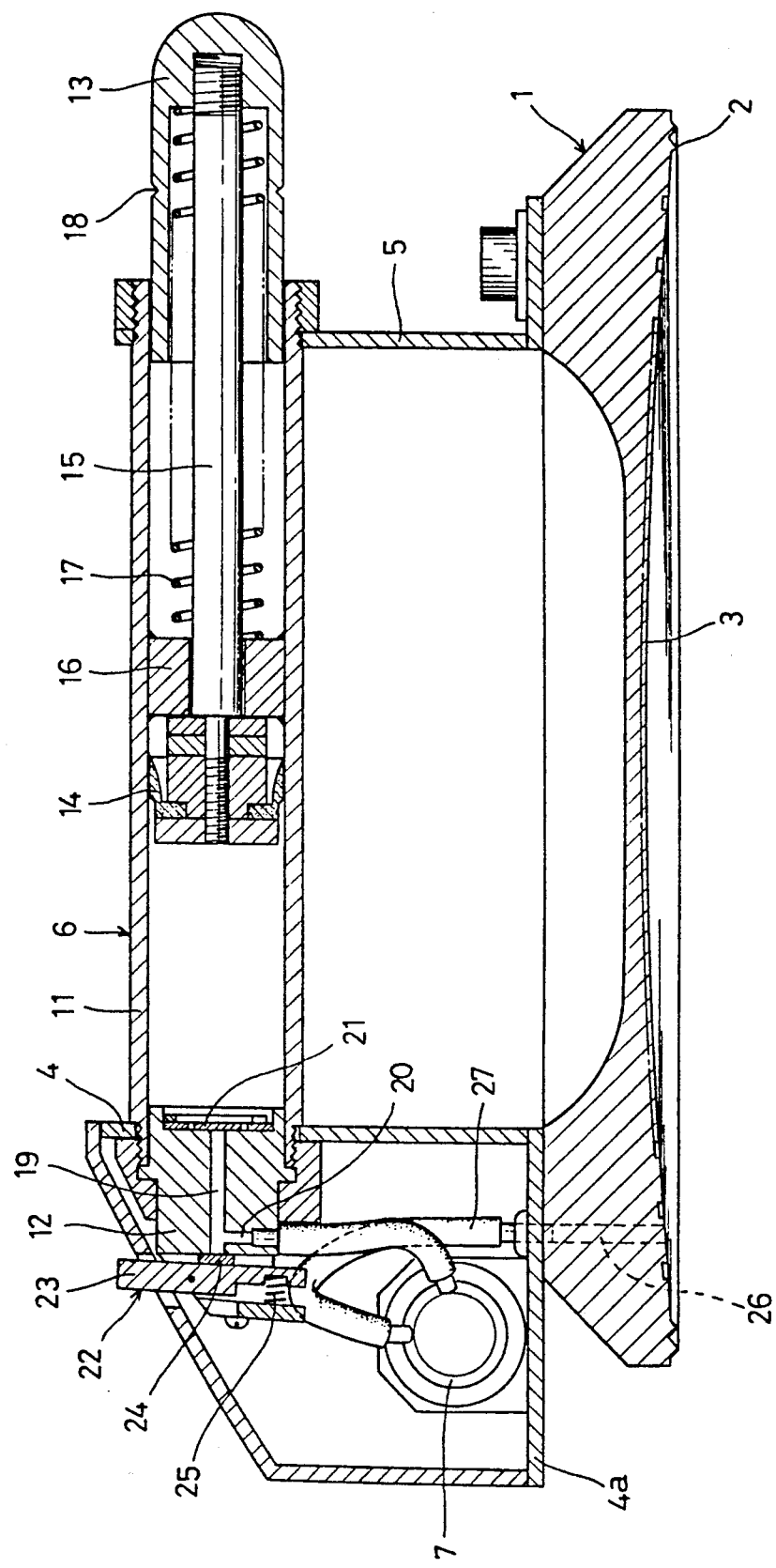
FIG. 4 is an enlarged vertical sectional view of the same.

The head 12 is provided with a passage 19 axially extending therethrough and a suction channel 20 communicating with the passage 19. A check valve 21 is provided on an end face of the head 12 which faces the interior of the cylinder 11 and to which the passage 19 opens. In the example of FIG. 4, the check valve 21 is in the form of a rubber plate but it may be of a ball-and-spring structure.

A vacuum release control valve 22 mounted on the front end of the head 12 comprises a control piece 23 pivotally mounted on a bifurcated part at the front end of the head 12, a resilient valve 24 secured to the control piece 23 to open and close the front opening of the passage 19, and a spring 25 for resiliently urging the control piece 23 to pivot in such a direction that the passage 19 is normally closed by the resilient valve 24. The passage 19 can be opened to the atmosphere by depressing the top end of the control piece 23 against the force exerted by the spring 25.

The suction channel 20 in the head 12 communicates through a suction channel 27 with a suction channel 26 formed in the sucker body 1 and opening to the suction recess 3. The suction channel 27 communicates at its intermediate portion with the sensor 7 for detecting the degree of vacuum which is fixedly mounted on a base plate 4a of the support plate 4.

The sensor 7 for detecting the degree of vacuum has an outwardly protruding piston lever 7a which moves in proportion to the degree of internal vacuum.

The switch 10, which is provided at a location corresponding to the piston lever 7a of the sensor 7 for detecting the degree of vacuum, is connected in circuit between the sound generator 8 and the power source 9. When the degree of vacuum reaches a predetermined value, the sound generator 8 is switched on by the piston lever 7a of the sensor 7 for detecting the degree of vacuum, so that a sound is generated.

The switch 10 comprises two limit switches 10a and 10b provided one on the other. The working elements of the respective limit switches have different working strokes from each other to cause a delay in the on/off changeover of the piston lever 7a and thus to generate a sound when the degree of vacuum is within a predetermined range.

Figure 6A:
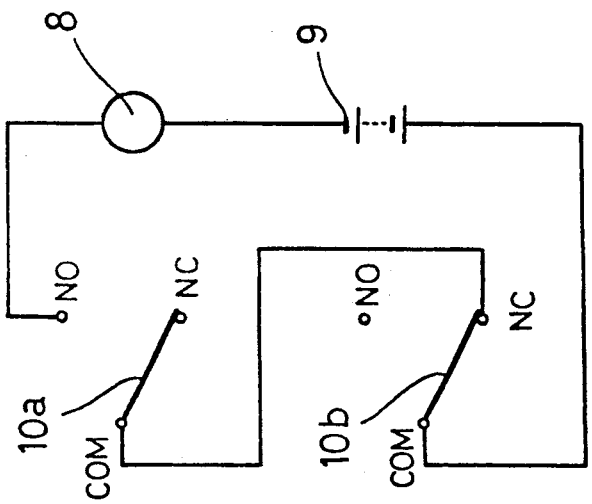
FIG. 6A-6C are circuit diagrams for the sound generator.
Figure 6B:
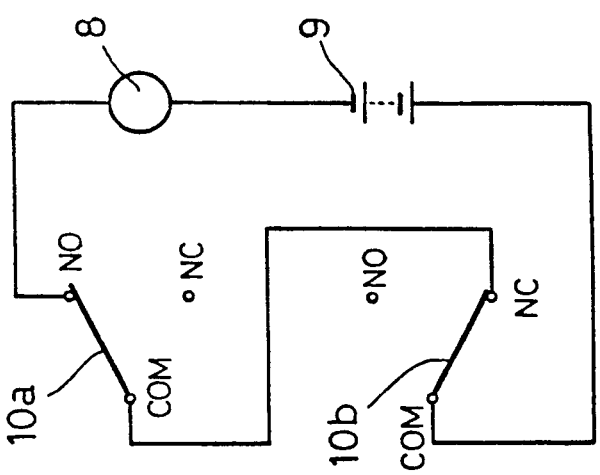
Figure 6C:
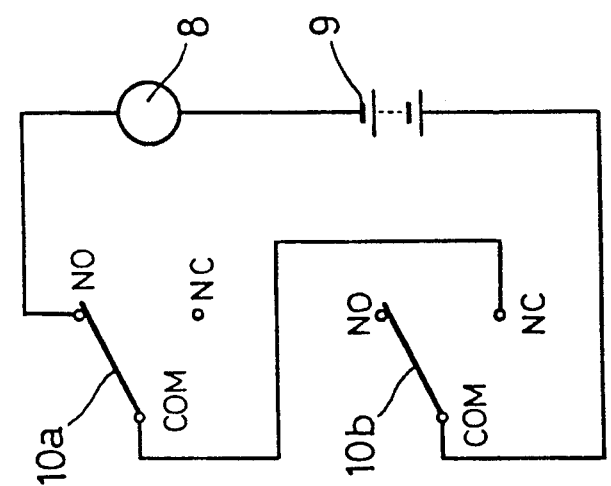

FIGS. 6A–6C show the connection of the switch 10, sound generator 8 and power source in three different states. FIG. 6A shows the exhaust state, FIG. 6B shows the state where a predetermined degree of vacuum is detected and FIG. 6C shows the state of maximum vacuum.

In operation, the control member 13 of the manual vacuum pump 6 is reciprocated with the sucker body 1 placed on a sheet of plate glass.

By reciprocating the piston 14, a vacuum is produced in the cylinder 11, so that the air in the suction recess 3 is drawn out through the check valve 21 and the sensor 7 for detecting the degree of vacuum. As a result, the suction surface 2 of the sucker body 1 is stuck to the plate glass.

The higher the degree of vacuum, the shorter the length of retraction of the piston 14. Thus, the control member 13 is gradually pushed into the cylinder 11, so that the suction force increases. As the degree of vacuum approaches the maximum value, the switch 10 is moved to the position shown in FIG. 6B and turned on by the action of the retracting piston 7a of the sensor 7 for detecting the degree of vacuum. Thus, a sound is produced which indicates that the degree of vacuum is at a right level.

When the vacuum reaches the maximum level, the switch 10 is changed over to the state of FIG. 6C, so that the sound generator 8 is turned off. In this state, the control member 13 is pushed deepest into the cylinder 11 and the plate glass can be lifted by gripping the cylinder 11.

If in this state the degree of vacuum should fall due to leakage at the sucking portion, the control member 13 will protrude gradually from the end of the cylinder and at the same time the piston lever 7a of the sensor 7 for detecting the degree of vacuum will also gradually protrude, changing the position of the switch to the state of FIG. 6B. Thus, a warning sound is produced by the sound generator 8.

When the degree of vacuum is increased in this state by controlling the manual vacuum pump 6, the position of the switch 10 will be changed over to the state of FIG. 6C by the sensor 7 for detecting the degree of vacuum, so that the sound from the sound generator 8 stops.

If the degree of vacuum falls, the switch 10 is kept in the state of 6B for a prolonged period of time by the sensor 7 for detecting the degree of vacuum. Thus a sound is produced continuously by the sound generator 8. Also that portion of the control member 13 having indicator line 18 protrudes from the cylinder. This makes it possible to visually check the degree of vacuum.

To break the sucking state, the control piece 23 is pushed in to bring the passage 19 into communication with the atmosphere.

What is claimed is:

1. A sucker comprising: a sucker body having a suction surface and defining a suction hole at said suction surface; a pair of support plates disposed on said sucker body; a manually operatable vacuum pump extending between said support plates, said vacuum pump defining a suction hole therein through which air is evacuated when the pump is manually operated; a suction channel placing the suction hole of said vacuum pump in communication with the suction hole of said sucker body; a sensor communicating with said suction channel, said sensor including a piston lever which moves in proportion to the degree of vacuum in said channel; a switch operatively connected to said piston lever so as to be closed by said piston lever when the degree of vacuum sensed by said sensor reaches a predetermined value; a power source; and a sound generator in circuit with said power source via said switch, said sound generator generating sound when power is supplied thereto, and said sound generator being operatively electrically connected to said power source when said switch is closed so as to receive power therefrom and generate sound.

2. A sucker as claimed in claim 1, wherein said switch comprises two limit switches in circuit with said sound generator and said power source, said two limit switches having different working strokes.

* * * * *